United States Patent [19]

Schneider

[11] Patent Number: 4,814,079
[45] Date of Patent: Mar. 21, 1989

[54] SPIRALLY WRAPPED REVERSE OSMOSIS MEMBRANE CELL

[75] Inventor: Burnett M. Schneider, Burlington, Wis.

[73] Assignee: Aqua-Chem, Inc., Milwaukee, Wis.

[21] Appl. No.: 177,456

[22] Filed: Apr. 4, 1988

[51] Int. Cl.[4] .............................................. B01D 13/00
[52] U.S. Cl. ................................ 210/321.83; 210/456; 210/487; 210/494.1
[58] Field of Search ................ 210/456, 321.83, 494.1, 210/321.85, 487

[56] References Cited

U.S. PATENT DOCUMENTS

| | | | |
|---|---|---|---|
| 2,599,604 | 7/1949 | Bauer | 210/321 |
| 3,173,867 | 3/1965 | Michaels | 210/321 |
| 3,367,504 | 2/1968 | Westmoreland | 210/321 |
| 3,695,446 | 10/1972 | Lyall | 210/321 |
| 3,813,334 | 5/1974 | Bray | 210/321 |
| 3,827,564 | 8/1974 | Rak | 210/321 |
| 3,928,204 | 12/1975 | Thomas | 210/232 |
| 3,962,096 | 6/1976 | Ishii et al. | 210/494.1 X |
| 4,053,418 | 10/1977 | Newman | 210/321 B |

FOREIGN PATENT DOCUMENTS 7245992  7/1974  France .............................. 210/321.5

*Primary Examiner*—Frank Spear
*Attorney, Agent, or Firm*—John C. Cooper, III; C. Thomas Sylke; Fred Wiviott

[57] ABSTRACT

A spirally-wrapped reverse osmosis membrane cell employing an envelope of semipermeable membrane sheets spirally wound or wrapped about a tubular mandrel. The convolutions of the membrane assembly are separated to form an open channel, directed feed flow path leading into a lateral opening or series of openings in a communicating tubular member defining an unobstructed bore throughout its length. The feed separator may comprise a plurality of substantially parallel strips of impermeable material of a thickness sufficient to provide desired separation between membrane sheets and wherein the strips define a meandering fluid flow path throughout the length and width of the membrane sheet.

13 Claims, 3 Drawing Sheets

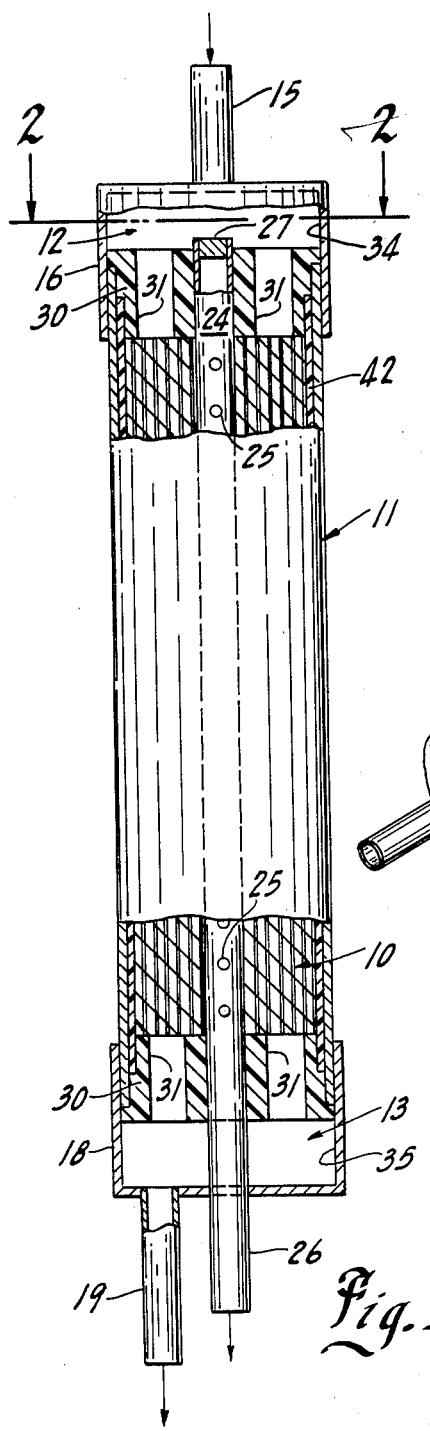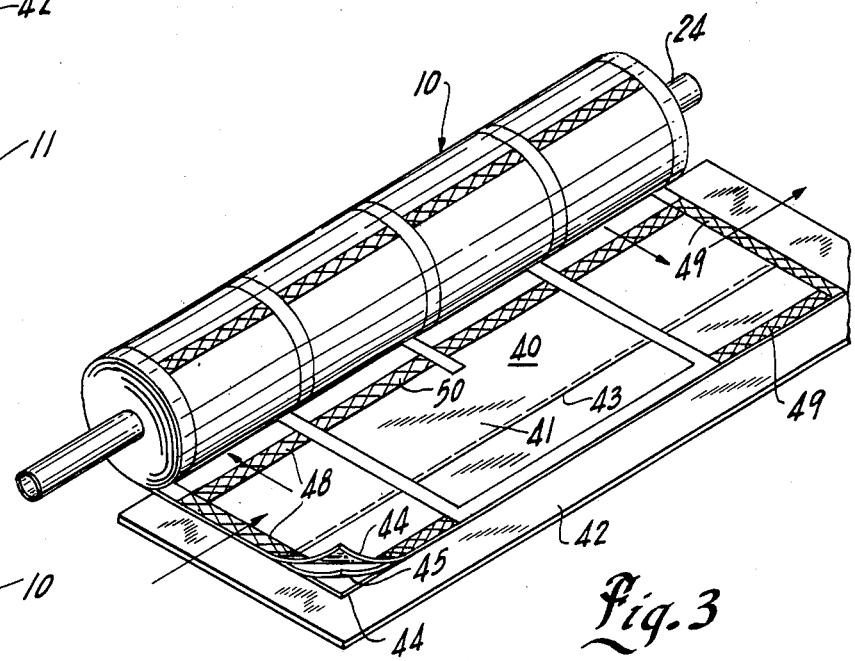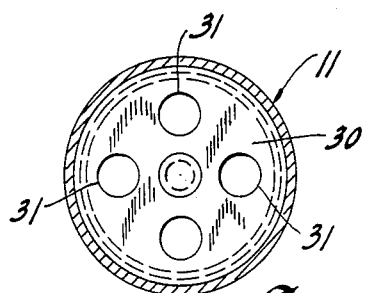
Fig.1
Fig.2
Fig.3

SPIRALLY WRAPPED REVERSE OSMOSIS MEMBRANE CELL

BACKGROUND OF THE INVENTION

1. Field of the Invention

This invention relates generally to the art of reverse osmosis and ultrafiltration, and in particular, to reverse osmosis, ultrafiltration, or microfiltration devices employing an envelope of semipermeable membrane sheets spirally wound or wrapped about a tubular mandrel. The convolutions of the wound membrane sheet or sheets are separated from one another and a feed solution is introduced therethrough with permeated fluid passing through the membranes by a pressure driving force and discharged into the hollow mandrel.

2. Description of the Prior Art

In reverse osmosis, ultrafiltration and microfiltration devices, an impure solution or a solution to be concentrated is brought into contact with a semipermeable membrane. A pressure is applied to the solution to force liquid (the permeate) through the membrane, thereby filtering or concentrating the initial solution. Membranes can be selected for a particular use by comparing the average porosity of the membrane and the size or molecular weight of the solute or particles of the starting solution. Moreover, membranes may be of two different shapes, e.g. hollow tubes or flat sheets. The flat sheet membrane can be installed in devices in spirally-wound, or with plates and frames configurations. In the spiral-wound system, one or more flat sheets of membrane material are wound around a perforated permeate collection tube. Fluid flow through the modules is unidirectional, i.e. permeate passes through the membrane to the collection tube, while the concentrated residue passes along one side of the membrane to be collected or discarded. The membrane sheets are sealed on three of the four edges and the fourth edge is sealed to the collection tube and communicates therethrough through the perforations.

Examples of prior art spiral-wound modules are described in U.S. Pat. Nos. 3,695,446; 3,827,564; 3,813,334; 3,928,204; 3,367,504; 3,173,867 and 2,599,604. Examples of patents providing a meandering course for the flow of feed fluids are shown in the Newman Patent No. 4,053,418 and the French Publication No. 2,211,274 published July 19, 1974.

The prior art devices, as exemplified by the above-referenced patents, in general, utilized grid-like or mesh layers for maintaining the gap adjacent the semipermeable membranes. The mesh or open grid separator defines the feed water channel dimensions. Unfortunately, the flow of fluid across the surface of the membrane was controlled by and often hindered by such separators.

The surface of the membrane must be washed with the flow of the feed fluid across the surface of the membrane to prevent concentration polarization of ionic salts and suspended solids. In the case of reverse osmosis membranes and salt solutions a velocity of 0.5 to 1 foot per second is sufficient to minimize concentration polarization when the feed water does not contain suspended solids. When suspended solids are present, they tend to concentrate at the membrane surface as the water passes through the membrane. Even in very low concentrations the solids can form a film on the surface which reduces the production rate of the membrane. Increasing the transverse velocity of water across the surface of the membrane reduces the thickness of the film of suspended solids and maximizes the production rate. Conventional limits of suspended solids at the low velocities is a Silt Density Index of less than 5 and a maximum turbidity of one Nephelometric Turbitiy Unit (NTU), when using conventional commercial spiral wound reverse osmosis elements. This usually represents a suspended solids concentration of less than 1 part per million (ppm).

In many cases, particularly where there are relatively few suspended solids, the usual grid or mesh separator sheets that are found in commercial reverse osmosis elements will suffice to provide sufficient flow of fluids. However, it has been found in certain installations, and in particular where it is desired to pretreat water taken from flowing rivers and the like, the source is often quite turbid. Conventional devices tend to foul quickly with the mesh or grids of the separators becoming clogged, and the membrane becoming fouled, thereby reducing the operating hours between cleanings, increasing the operating pressure to maintain a given production rate, or reducing the production rate. To achieve higher velocities a open feed channel separator is required. This has normally been accomplished with plate and frame hollow tube or hollow fiber devices. However, spiral wound devices are less expensive to construct since they normally use a tube as a container.

The Newman Patent No. 4,053,418 discloses a coiled dialyzer used in artificial kidney systems wherein there is an embossed support member constructed to prevent the membrane from contacting the web of the same support member to assure uniform dialysis flow between the membrane and the web. In this case the separator is in the form of an imperforate, impermeable web and includes integrally formed embossed ribs which define angular flow channels, and also act to separate the support or web from the semipermeable membrane. The Heden U.S. Pat. No. 3,352,422 provides "saw tooth" obstruction in "plate and frame" type of dialysis apparatus. Thus a cylindrical disk includes a center hole for passing through one of the flows of fluid and spirally formed grooves, the inner end of the same being placed in the proximity of the center hole. The saw-tooth formation is applied to the edges or ridges of the grooves.

A spirally wound membrane construction was also disclosed in the French Publication No. 2,211,274, wherein the membrane construction included a tubular member comprising two tubular sections separated from one another by means of a cylindrical watertight plug inserted into one end of each section. Each section includes a lateral or side opening communicating with a recessed passage in the membrane composite. The continuous recessed passage is generally U-shaped, with a separate tongue-like portion extending laterally from the area of the plug when one end of the membrane composite has been secured to the tubular mandrel. Thus, the fluid to be separated or filtered enters one section of the mandrel, leaves that section via its lateral opening and into one side of the U-shaped passage and around the projecting "tongue" to exit on the other side and into the lateral opening of the opposite tubular section.

The aforementioned Newman and French patents are examples of open feed channels where guidance ribs or paths are used. Their methods of construction are relatively expensive to manufacture. There are other limitations to their respective designs. The Newman design is intended for dialysis applications where differential pressures are low and the membrane homogenous. In reverse osmosis applications, where the differential pressure or driving force across the membrane is on the order of 400 psi, the projections on the surface of the separator would stretch and rupture the membrane. The membrane would also lie tightly against the surface of the permeate separator, restricting the flow of the permeate. In the French design, only one active membrane surface is exposed to the flow of the feed solution. This severely limits the total amount of membrane area that can be placed in the spiral element. It would also limit the number of sheet assemblies or leaves that can be installed. An element that would contain a large surface area would also have an extremely long flow path which would create a relatively high pressure drop, and would limit the surface velocities of the feed water over the membrane surface.

Conventional commercial spiral wound reverse osmosis element designs and other spiral designs, such as disclosed in the Westmoreland Patent No. 3,367,504, use a grid or mesh in the feed flow path which obtructs or interferes with the free flow of feed water. The mesh or grid restricts the cross sectional area of the flow path. Turbulence is created between the strands. These effects combine to create high pressure drops in the feed channel at high velocities. The typical feed channel pressure drop in a 40 inch long reverse osmosis element is 10 psi at one foot/second and 220 psi at 4 feet/second. It is clear from this example that the surface velocities of the conventional spiral wound elements is limited to a maximum velocity of one foot per second. The pressure drop of the flow channel increases when the water contains suspended solids. This further limits the velocity of water in the feed channel. The water directly behind the strands of mesh is relatively stagnant. The suspended solids tend to deposit underneath the strands of the mesh. This fouls microfiltration, ultrafiltration, and reverse osmosis membranes with a thick layer of deposited solids buildup.

STATEMENT OF THE INVENTION

There is provided by virtue of this invention a relatively inexpensive separator means for spirally-wound membrane module assemblies, which eliminates the need for mesh or grid-like supporting materials disposed between the membrane sheets. The improvement may be made to conventional semipermeable membrane devices without change of construction of the casing retaining the coiled membrane sheet, the conventional membrane sheet, itself, the mandrel, or to backing material conventionally applied to the semipermeable membrane layer or layers.

The invention consists of an assembly comprising spiral-wound microfiltration, ultrafiltration and reverse osmosis elements formed with an open channel, directed feed flow path and into a lateral opening or series of openings in a communicating tubular member defining an unobstructed bore throughout its length. The flow of fluid across the surface of the membrane is controlled by the feed separator. The feed separator may comprise a plurality of substantially parallel separator strips of impermeable material of a thickness sufficient to provide desired separation distance between membrane sheets, and which strips may take the form of opposed marginal strips terminating at one end thereof at the aforementioned hollow, perforated mandrel and extending to communicate with entrance and exit openings, which may include a short length of a mesh or grid strips, and located at the terminal end of the wound membrane sheet or sheets. Intermediate the marginal strips are alternatively arranged intermediate strips which may be of the same material as the marginal strips or are disposed on the same membrane surface as the marginal strips and substantially parallel therewith. That is, one end of intermediate strips is disposed proximate to the hollow mandrel, whereas its distal end terminates at a point spaced from the terminal edge of the wound membrane sheet. Alternate intermediate strips have their respective ends positioned approximate the distal edge of the membrane and extend inwardly with the inner ends thereof being spaced from the hollow mandrel. This arrangement provides a meandering or serpentine path for fluids entering the spirally-wound assembly through the entrance and exit openings located at opposite marginal sides thereof. Thus, there is a relatively unimpeded flow of fluid, which has a longer contact time in its path by the meandering arrangement, in contrast to flow of fluid through the grid or mesh-like supporting material to thereby be eventually restricted by collection of sediment carried by the fluid stream.

It is therefore a primary objection of this invention to overcome problems which may arise from application of the semipermeable membranes acting upon waters or other fluids containing high levels of suspended solids. The desired mechanical configuration provides limitation on the velocity of fluid passing over the membrane particularly in the conventional spiral-wound design which is relatively wide with a short feed channel typically 36 to 60 inches wide and 35 to 55 inches long.

It is another object of the present invention to provide a spiral-wound membrane module that takes advantage of an open feed channel to maintain a maximum flux rates of the membrane or membranes by maintaining a minimum transverse velocity of 3 to 10 feet per second. For instance, a typical conventional commercial 4 inch spiral wound reverse osmosis element has a maximum feed flow rate of 16 gpm. It contains about 70 square feet of membrane area and three or four leaves. Each leaf has two membranes with a total area of 17.5 to 23.3 square feet. The dimension of a leaf is typically 36 inches by 35 to 43 inches long including an overwrap area. The mesh that forms the feed separator is typically 0.030" thick. The cross sectional area of the flow path is 0.030"×43" or 1.29 square inches. At a maximum flow rate of 5.3 gpm per leaf the velocity of the feed water is about 1.32 feet per second. To increase the velocity to 9 feet per second would require a feed flow rate of 36 gpm per leaf or 108 gpm per element. The feed port connection is typically a ⅜ inch pipe. The velocity within the pipe would be on the order of 200 feet per second. Clearly the pressure drop in the feed pipe, along with entrance and exits losses, and the pressure in the element would be extremely high and totally impractical. To obtain the high velocities within the element requires that it be done with the normal flow range of 8 to 16 gallons per minute (gpm). In the separator of the invention the flow path is divided by the flow path strips. The typical flow path width is about 9 inches wide. The cross sectional area of the flow path is 0.27 square inches. At the maximum shell flow rate of 16 gpm at 5.3 gpm per leaf, the velocity is 6.3 feet per second. Reducing the leaves from 3 to and maintaining the total area by increasing the length of the leaves produced a velocity of 9.5 feet/second at 16 gpm. The configuration disclosed herein minimizes the flow rate required to produce a reasonably high velocity with a minimum pressure drop.

Another object of the present invention is to provide spiral-wound membrane elements or devices which are relatively economical to manufacture since such wound devices utilize relatively inexpensive pipes or conduits as containment vessels. Prior plate and frame designs are generally more expensive to manufacture since the separators are injection molded or die cut from sheet stock and machined. End plates and stongbacks require welding and machining and the clamping system is relatively expensive to manufacture.

It is still another object of the present invention to provide a modified spiral-wound module utilizing the same flow rate per element as used in conventional spiral-wound designs, but with a velocity of approximately seven times that of prior designs. The design balances the economy of manufacturing with high performance of directed flow open channels and allows the simple replacement of the elements in existing systems without flow rate changes.

BRIEF DESCRIPTION OF THE DRAWINGS

FIG. 1 is an elevational view, partly in section and with parts broken away of one embodiment of a spiral-wound reverse osmosis membrane cell in accordance with the present invention;

FIG. 2 is a cross-sectional view taken along lines 2—2 of FIG. 1;

FIG. 3 is a perspective view of a membrane layup as seen during the fabrication of a membrane module of the unit of FIG. 1;

DESCRIPTION OF THE PREFERRED EMBODIMENTS

Figure 7:
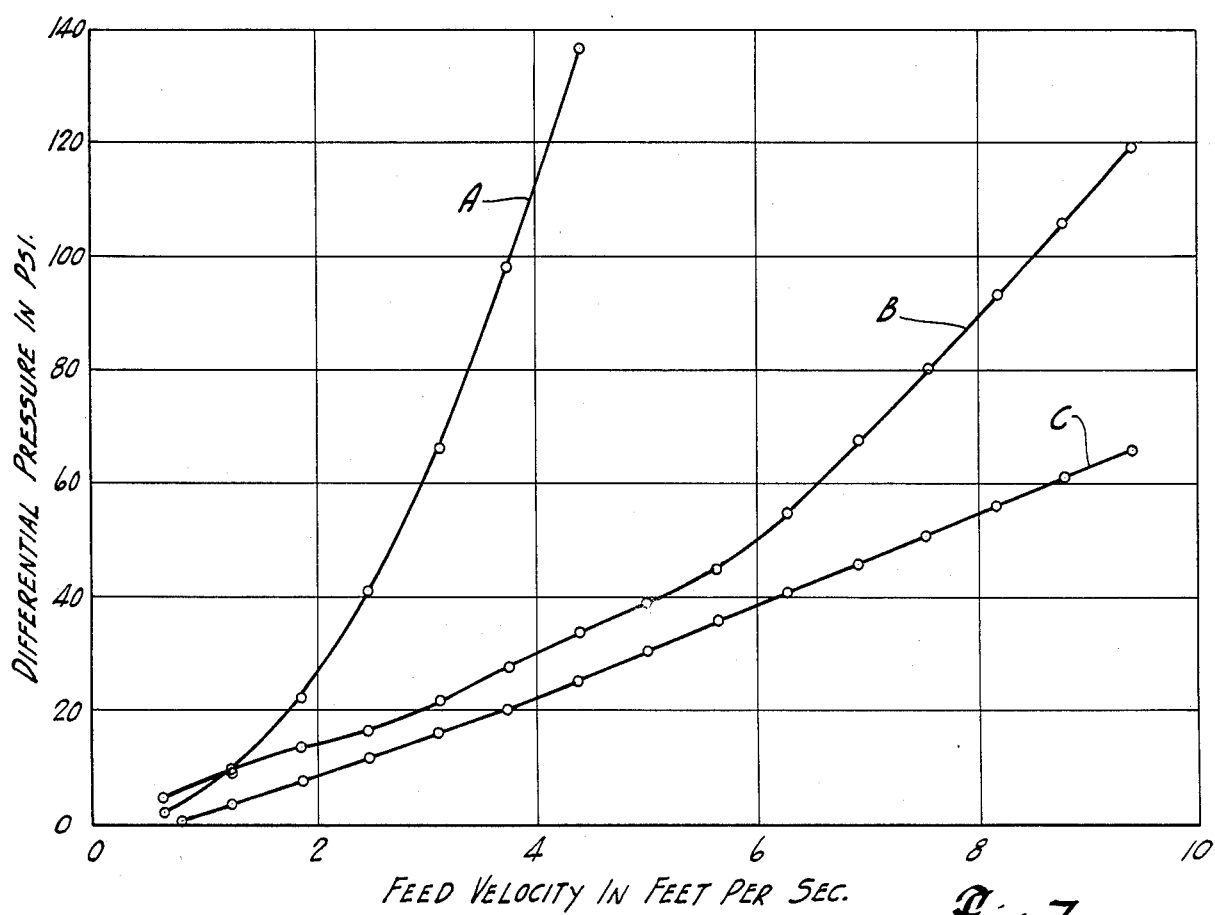
FIG. 7 is a graphical representation of the pressure drop characteristics of a 2.5 inch diameter by 14 inch long reverse osmosis element versus the transverse velocity of feed flow.

As stated above, the present invention consists of a device wherein spiral wound microfiltration, ultrafiltration and reverse osmosis elements are formed to provide an open channel, directed feed flow path. Flow of fluid across the surface of the membrane is controlled by the feed separator. The feed separator is a flat sheet with a flow path cut out to direct the feed flow. The channel that is created between the membranes is thin, narrow, open and directed in a serpentine or meandering path across the membrane surface. The entrance or exit of water into or out of the separator is provided by a flow strip. This is a strip of grooved material or a strip of mesh that allows water to enter or exit the separator while providing support to maintain the separation of the membranes. The flow strip can be thicker than the feed separator to minimize its pressure drop, as illustrated in FIG. 7 and described hereinbelow. The separator is wound along with the membranes in a spiral to form the element. The element is inserted into a pressure vessel or casing to confine and separate the processed fluids.

Thus, with particular reference to the views of FIGS. 1 and 2 of the drawings, there is provided a membrane module indicated generally at 10, a casing 11 for containing the module, a feed solution entrance assembly 12 and a rejected or concentrated solution assembly 13.

The inlet assembly 12 comprises a feed inlet pipe 15 secured by brazing, welding, fastening or the like to a cap 16 which is secured to the casing 11. At the lower end, with reference to FIG. 1, of the device is a cap 18 secured to the casing 11 which includes an outlet pipe 19 secured thereto by welding, brazing, fastening or the like.

A central tube 24 containing a plurality of lateral openings or apertures 25 is disposed substantially coextensive of the length of casing 11 and protrudes through a sealed opening in the lower cap 18 to provide an outwardly extending permeate exit tube portion 26. The outlet pipe 19 provides an exit for permeate, which will hereinafter be described. The upper end, with respect to FIG. 1, of the central tube 24 is closed by means of a sealing plug 27 or can be extended through the case.

The central tube 24 is further supported at opposite ends in central openings of anti-telescoping devices or cylindrical spiders 30. As shown in cross section in FIG. 2, both the upper and lower spiders 30 are substantially identical and contain a plurality of openings 31; in this case four each. Each spider 30 may be made of a plastic material having an outer stepped diameter to provide a sealing engagement with the casing 11, the caps 16 and 18, and the membrane module 10. It will be observed that there is provided an upper chamber 34 and a lower chamber 35. The upper chamber collects the feed solution entering from the inlet pipe 15, which is further guided to the membrane module 10 through the apertures 31 of the upper spider 30, whereas the lower chamber 35 collects the concentrate entering from the apertures 31 of the lower spider 30 and permits it to exist through the outlet pipe 19. As will hereinafter be described, the permeate exits through the permeate tube portion 26 of the central tube 24, having entered the tube through the apertures 25 from the membrane module 11. The plug 27 prevents entry of fluid into the central tube.

FIG. 3 discloses the features of the membrane module 10 and its method of fabrication with particularity. The module 10 includes the central mandrel or tube 24, upon which a membrane layup comprising an envelope 41 and an overwrap 42 is spirally wound. The envelope 41 comprises a semipermeable membrane and backing material layers 44 and an intermediate permeable support 45. The materials of the membrane and backing layers 44 and 45 are quite conventional, and it will be seen from FIG. 3 that the membrane and backing layers are suitably bonded together to provide a fluid-tight seal along three edges using a conventional adhesive 43 to thereby provide the envelope 41, but with the fourth edge left open to seal with the tube 24 (see FIG. 4).

The semipermeable membrane 44 is generally in the form of a thin sheet of material having predetermined permeation properties. A suitable material for the semipermeable membrane 44 is of a non-woven polypropylene fabric, with a linear polysulfone microfiltration or ultrafiltration layer cast thereon, and including a cast layer of a polyamide condensation polymer that is formed by an interface between two solutions which normally give reverse osmosis characteristics when required. Although only one bag leaf or envelope 41 is shown herein, there may be two or more bags attached to the tube if and when desired to increase the total surface area.

The present construction presents particular advantages where the conditions of the fluid to be separated are particularly dirty or full of silt or other turbidity which is not present in the usual prior art devices needed for desalinization or dialysis. Separators, as shown in the Westmoreland Patent No. 3,367,504, are quite satisfactory for the usual purposes, but because of the mesh or grid-like separator found in such devices, sediment or other turbulence-causing agents tend to foul the membrane and the mesh and thereby interfere with flow of fluid.

Accordingly, the present membrane module 10 has for its principal object the elimination of the mesh and also provides an improved control geometry of the feed flow. The present construction provides a long path with a relatively decreased cross sectional area to permit the flow of copious amounts of fluid for high velocity. This is accomplished by utilizing only a minimum amount of separating mesh, such as the entering or exiting mesh strips 48 and 49, and lateral supporting strips 50, each being approximately one inch wide. The object is to minimize, as far as possible, the use of mesh or grid-like separators, to thereby minimize impedance of feed flow through the membrane cell.

Figure 4:
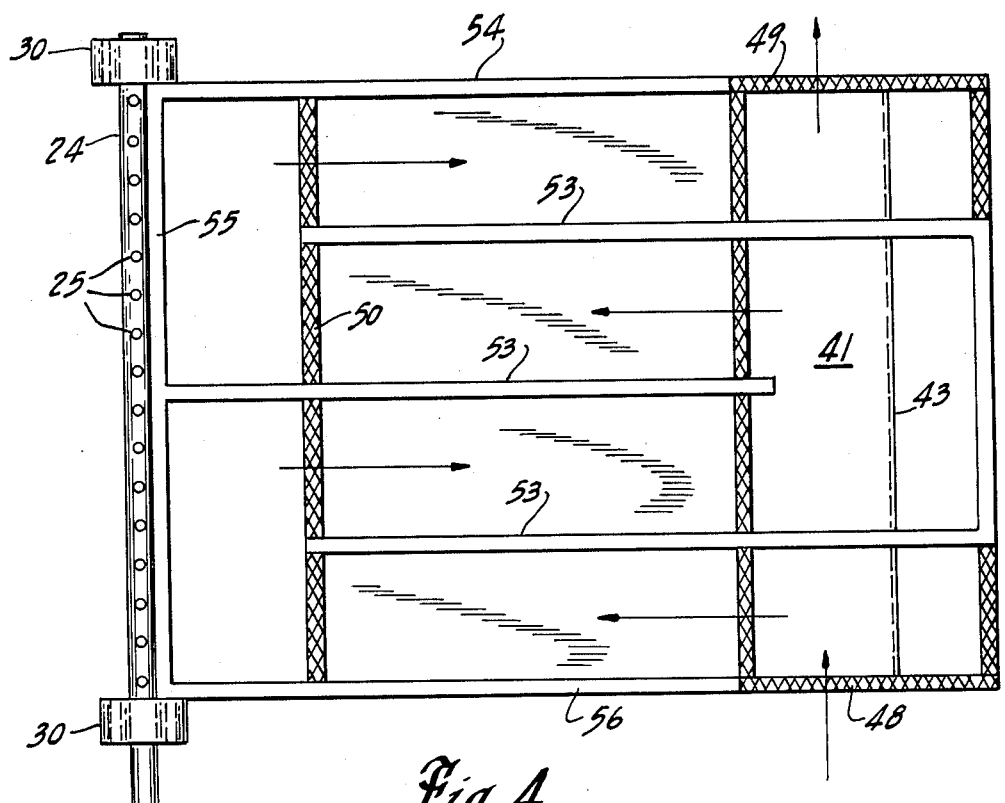
FIGS. 4 and 5 are plan views of a variation in embodiments of the present invention and illustrate the present invention as applied to a semipermeable membrane unit prior to spiral winding or wrapping the membrane sheet around a perforated hollow mandrel member.
Figure 5:
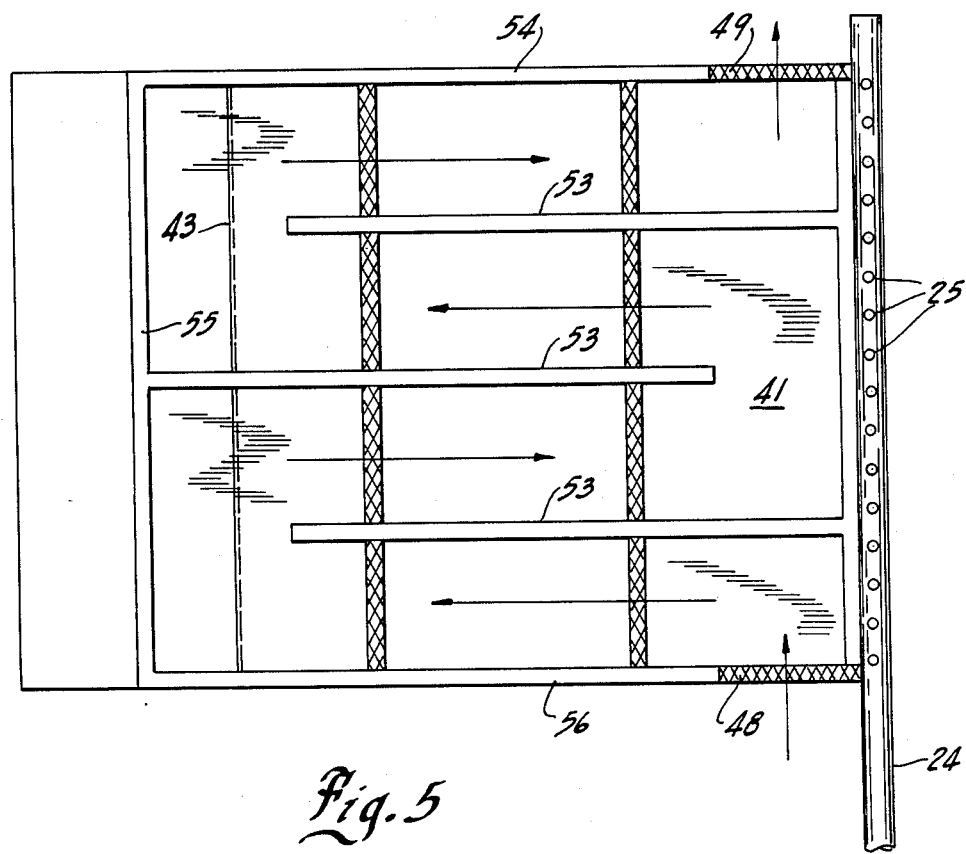
Figure 6:
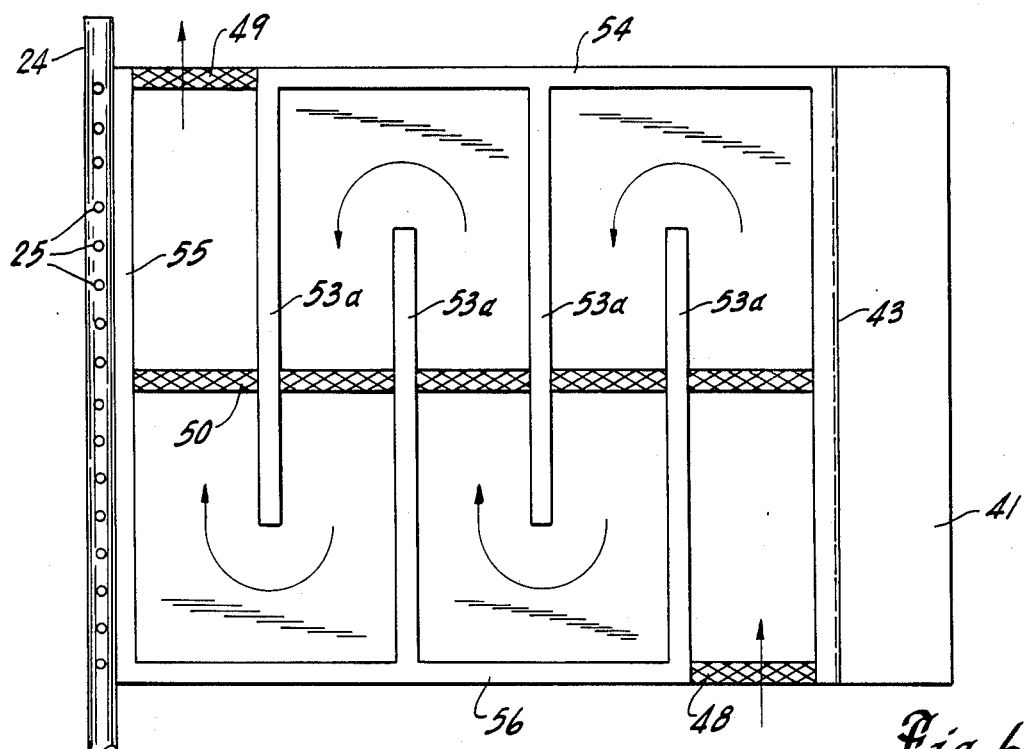
FIG. 6 is a plan view of an alternate separator arrangement which illustrates a less desirable feed separator configuration defining flow channels arranged substantially normal to the channel configuration illustrated in the embodiment of FIGS. 5 and 6.

The embodiments illustrated in FIGS. 4 and 5, and an alternative disclosed in FIG. 6, disclose the meandering or serpentine path, wherein the envelope 41 containing the backing layers 45 and membrane layer 44 are shown attached to the tube or mandrel 24. The apertures 25 of the tube 24 are exposed to collect fluid flowing through the semipermeable membrane 44. Fluid flow is shown by means of the arrows in FIGS. 4 and 5. It will be observed that entrance of the fluid will be through the relatively short mesh entrance or inlet strip 48 communicating with the apertures 31 of the upper spider 30 (see also FIGS. 1 and 2), which apertures in turn communicate with the chamber 12 for collection of entering fluid from the inlet pipe 15. A plurality of channel spacer or separator members or strips 53 are disposed in parallel, spaced apart relationship with respect to one another and with marginal channel strips 54, 55, and 56 to define the feed flow channel or paths. The strips or spacers 53-56, inclusive, are of sufficient thickness to provide the channel or fluid path for each convolution when the membrane module 10 is spirally wound upon the tube 24. The material of the spacers is not of particular importance, other than it should be impermeable with respect to the fluid to act as a barrier and guide for the fluid flow. Polyethylene or a soft polyvinyl chloride, for instance, may be acceptably used for this purpose. Thus, fluid entering the short mesh inlet strip 48 will follow the arrow path from right to left with respect to FIG. 4, and thence along the next arrow path to the end of the overwrap 42 and then outwardly of the exiting or outlet mesh strip 49 to the lower spider 30 and thence exiting at the outlet pipe 19. The permeate, itself, will enter the apertures 25 of the central tube 24 to exit through the tubular portion 26.

Since the intermediate channel strips 53 are not adhesively or otherwise bonded to the envelope 41, they are supported by means of the mesh supporting strips 50 which lie transversely across the envelope 41. These are of mesh of sufficient thickness and minimal width to permit separation, but at the same time permit desired fluid flow through the paths defined by the strips 53. They can also be narrow solid strips that are less than ½ of the separator thickness. The function of the strips is to prevent lateral displacement of the strips 53, 54, and 56 which could result from the differential pressure of either side of the strips.

FIG. 5 is illustrative of an oppositely directed fluid flow, and like reference numerals are utilized for the same elements in both the FIGS. 4 and 5 embodiments. In the case of the embodiment of FIG. 5, the flow is reversed, as shown by the arrows, with the same effect and substantially the same results. The drawings show an element with one leaf. Multiple leaves may be used in the construction.

Tests of the improved membrane module 10 were conducted during the summer months of July and August in the mouth of the Appomattox River known for its high turbidity. The water temperature ranged between 83° F. and 90° F. As a result the water was high in turbidity and biologically active, with turbidities ranging from 20 to 60 NTU'S. Total turbidity peaks resulting from boat traffic ranged from 100 to 1,000 NTU's. The feed water was composed primarily of sodium chloride, sodium bicarbonate and calcium bicarbonate. The pH was less than 7 indicating a relatively high carbon dioxide concentration, further indicating high levels of bacteria which produce the carbon dioxide.

Total suspended solids were relatively high at 26 to 30 milligrams/liter (Mg/l). One half of the suspended solids were volatile and the ratio of turbidity to suspended solids was near one. This indicates that about one half of the suspended solids was composed of organic matter. It was probably a combination of organic detritus (silt) and active biological organisms. Algae was visibly present at times.

Tests indicate that the velocity of the water over the surface of the reverse osmosis membrane was an important factor. It affects the rate of fouling of the membrane with suspended solids. The lower the flow rate or velocity, the faster the reverse osmosis membranes fouled.

The test results, in this highly turbid media, indicated that devices having mesh separators which entirely cover the area between membrane elements had fouling rates that were unacceptable. The standard elements tested had a flow path width of 55 inches by 0.030 inch thick with a path length of 18 inches. The velocity factor was 0.194 feet per second per gallons per minute. At a feed rate of 5 gpm the velocity of the water in the separator was found to be 0.97 feet per second (fps). The standard or conventional test elements were initially operated at 3.7 gpm at a velocity of 0.72 feet per second and had a pressure drop of 10 psi. This is pressure drop ratio of 13 psi/fps. The variations in pressure drop are illustrated in FIG. 7, wherein three representative curves are shown. Curve A illustrates a pressure drop of a conventional reverse osmosis element similar to that disclosed in the Westmoreland U.S. Pat. No. 3,367,504. Curve B is illustrative of a pressure drop of an open channel reverse osmosis element according to the present invention and with the thickness of the entering and exiting mesh strips being substantially equal to the thickness of the separator strips 53. Curve C illustrates the pressure drop of an open channel reverse osmosis element according to the present invention, but with the thickness of the entering and exiting strips 48 and 49 being about 33% greater than the thickness of the separator strips 53.

It is to be noted for the record that Curves A, B and C are presented for general comparison only and to illustrate considerable improvement in pressure drop occurring in the Curves B and C when compared to a conventional spiral membrane construction. That is, although the data supporting each curve is accurate, the pressure drop data for Curve A was based upon prefiltered water entering the standard or conventional element.

The improved test elements had an initial flow rate of 1.92 gpm and a velocity of 2.73 feet per second and had a pressure drop of 1.5 psi at the start of the test run. This is an increase in velocity of 379 percent with a decrease in pressure drop of 667 percent. The pressure drop ratio is 0.55 psi/fps.

The flow rate was increased to 3.8 gpm. This gave a velocity of 5.4 feet per second and a pressure drop of 3.5 psi. This is an increase in velocity of 750 percent over the standard element with a decrease in pressure drop of 286 percent. The pressure drop ration is 0.65 psi/fps.

At the maximum flow rate of 6.0 gpm, the velocity was 8.6 feet per second and a pressure drop of 15.5 psi. This is an increase in velocity of 1194 percent over the standard or conventional element with an increase in pressure drop of 155 percent. The pressure drop ratio is 1.80 psi/fps. This is a substantial improvement over the conventional design which exhibited a pressure drop ratio of 13 psi/fps at 0.72 fps.

It appears obvious that the difference in velocities and pressure drops was due to the open channel of the improved reverse osmosis elements described herein. The mesh in the conventional, prior art elements creates a substantial pressure drop. It is supposed to increase the turbulence of the water at the surface of the membrane. Instead it appears to require that the flow rate and velocity be reduced to very low levels to operate at reasonable pressure drops. It also created low velocity areas behind and beneath the strands that allow suspended solids to deposit.

It will be apparent that the advantages of the open channel spiral wound reverse osmosis elements of the present design overcome the relatively high pressure drop of the mesh of the feed separator at low feed water velocities. The mesh traps suspended solids beneath and behind the strands of the mesh, severely fouling the membrane in those areas.

Velocities of the feed water from the separator of the conventional reverse osmosis element is normally on the order of 0.75 feet per second with a maximum of 1.3 feet per second. Velocities of the feed water in the separator of the present device are normally on the order of 3 to 4 feet per second with a maximum of 9 feet per second. This range is adequate to minimize fouling by suspended solids. Removing the mesh from the element and replacing it with a narrow, open, meandering flow path separator, results in an increase in the water velocity at similar pressure drops and allows operation at much higher than normal turbidities.

Further, the design reduces the need for troublesome, costly and space consuming pretreatment equipment that a conventional reverse osmosis system requires. Also to be considered is the reduction in capital cost wherein there is eliminated the expensive systems such as cyclones, media filters, diatomaceous earth filters, ultrafiltration systems, cartridge filter housings and polyelectrolyte feed systems. A bag filter to remove the coarse materials is the only filtration requirement. The construction also eliminates piping, gauges, valves, controls, frames engineering costs, purchasing, inventory and assembly costs associated with the filtration and backwash systems. Along with this, there is the elimination of the frequent backwashes that the media filter requires. This reduces operator errors in backwashing and polyelectrolyte dosing and simplifies the operation of the system.

An alternate, but less desirable, configuration for the feed separator is disclosed in FIG. 6. Like reference numerals refer to like elements described in connection with FIGS. 1–5. This type of separator would be suitable for normal plate and frame devices, but it is not well suited for the spiral wound, open channel, design. It does provide a good comparison to illustrate the importance of orientation in the preferred design. The primary reason for its lesser suitability is that the horizontal flow path divider strips 53a will not line up with each other as the element is wound around the permeate tube mandrel. This will cause the horizontal strips 53a to push into the upper or lower convolution and pinch off the flow channel causing excessive pressure drops. The misalignment would not provide the necessary sealing pressure to keep the feed water from crossleaking past the strips thereby short circuiting the feed flow rate. The horizontal strips could be placed so that they would overlap, but this would result in a flow path of different widths, with the narrowest widths controlling the pressure drop and velocity characteristics.

Also, in multiple leaf designs the separators are offset from each other which would again misalign the horizontal flow path strips. Another problem is that the flow entrance and exits are offset. This elmininates the advantages of using a thicker mesh in the entrance or inlet strip areas to minimize their pressure drops. Thicker entrance and exit strips would prevent adequate compression of the gasket or flow strips and allow cross leakage.

What is claimed is:

1. In a spirally wound membrane module comprising a casing defining a cylindrical chamber, a hollow, perforated mandrel disposed in coaxial relationship with and within said chamber, said mandrel having an unobstructed bore, an elongate envelope including a pair of semipermeable membrane sheets surrounding a permeate carrier sheet and spirally wound around said hollow mandrel and separator means maintaining spacial relationship between convulated layers of said elongate envelope, wherein the improvement comprises configuring the separator means to provide a dual function of maintaining said spacial relationship and of establishing a directed, open channel feed flowpath across the width and length of the convoluted membrane envelope, and wherein said flowpath is defined by said separator means to provide a non-interrupted meandering path extending from an inlet opening in one exposed marginal edge portion of said envelope and across the area defined substantially by the length and width of said envelope, to an outlet opening defined by the opposite marginal edge portion of said envelope.

2. The module according to claim 1, wherein said feed flowpath is defined by means of laterally spaced, fluid impermeable, separator strips positioned on one surface of said membrane envelope and arranged in alternative lengthwise relationship with one another to define a serpentine configuration.

3. The module according to claim 1, wherein said separator means comprises a pair of elongate, oppositely disposed, marginal strips of impermeable material extending outwardly from said mandrel for a major length portion of one surface of said convoluted envelope, the respective distal ends of said marginal strips terminating at a point greater than the longitudinal length of the membrane envelope to provide respective inlet and outlet fluid openings, and a plurality of alternately arranged, flow directing, impermeable strips laterally spaced relative to one another and to said oppositely disposed marginal strips, whereby fluid entering and leaving said inlet and outlet openings of the convoluted membrane envelope will be caused to follow a meandering and extended path between separated convolutions of said wound membrane envelope.

4. The module according to claim 3, wherein each of said marginal strips engage porous separator strips, said porous strips extending across said inlet and said outlet openings to provide separation and compression of the convolutions of said membrane envelope and passage therethrough of fluid moving through said flowpath.

5. The module according to claim 4, wherein the thickness of the porous inlet and outlet strips is greater than the thickness of the separator strips and located at the same end of the envelope.

6. The module according to claim 5, wherein the thickness of the porous inlet and outlet strips being at least one-third greater than the thickness of the separator strips.

7. The module according to claim 4, wherein the porous separator strips are of open mesh material.

8. The module according to claim 4, wherein the porous separator strips are grooved material.

9. The module according to claim 2, wherein the said laterally spaced separator strips are arranged to have a first set of alternatively arranged strips extend from the outer surface of said mandrel and a second set juxtaposed, alternatively arranged separator strips extending toward said mandrel from the proximity of the distal end of said membrane envelope.

10. The module according to claim 2, wherein said separator means includes at least one relatively narrow support strip of porous material extending transversely of the membrane envelope and engaging said impermeable separator strips to provide lateral support and maintenance of spacing of said separator strips width wise of said membrane envelope.

11. The module according to claim 10, wherein the porous support strips are of open mesh material.

12. The module according to claim 10, wherein the porous support strips are thin solid strips that are less than ½ of the separation thickness.

13. The module according to claim 10, wherein the porous support strips are thin cylindrical strands less than ½ of the separator thickness and bonded to both of the adjacent flow path strips.

* * * * *